No. 746,694. PATENTED DEC. 15, 1903.
A. GROFF.
RUNNING GEAR.
APPLICATION FILED AUG. 27, 1903.
NO MODEL. 2 SHEETS—SHEET 1.

Inventor
Aaron Groff.

No. 746,694. PATENTED DEC. 15, 1903.
A. GROFF.
RUNNING GEAR.
APPLICATION FILED AUG. 27, 1903.
NO MODEL. 2 SHEETS—SHEET 2.

No. 746,694.

Patented December 15, 1903.

UNITED STATES PATENT OFFICE.

AARON GROFF, OF OAKBOTTOM, PENNSYLVANIA.

RUNNING-GEAR.

SPECIFICATION forming part of Letters Patent No. 746,694, dated December 15, 1903.

Application filed August 27, 1903. Serial No. 170,932. (No model.)

*To all whom it may concern:*

Be it known that I, AARON GROFF, a citizen of the United States, residing at Oakbottom, in the county of Lancaster and State of Pennsylvania, have invented certain new and useful Improvements in Running-Gears, of which the following is a specification.

This invention has relation to vehicle running-gear, the vital feature being to enable the successful use of two bolsters and springs with the rear axle, so as to obviate torsional strain and equalize the load thereon, the essential feature being to provide novel and substantial bearings and connections for the component parts.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
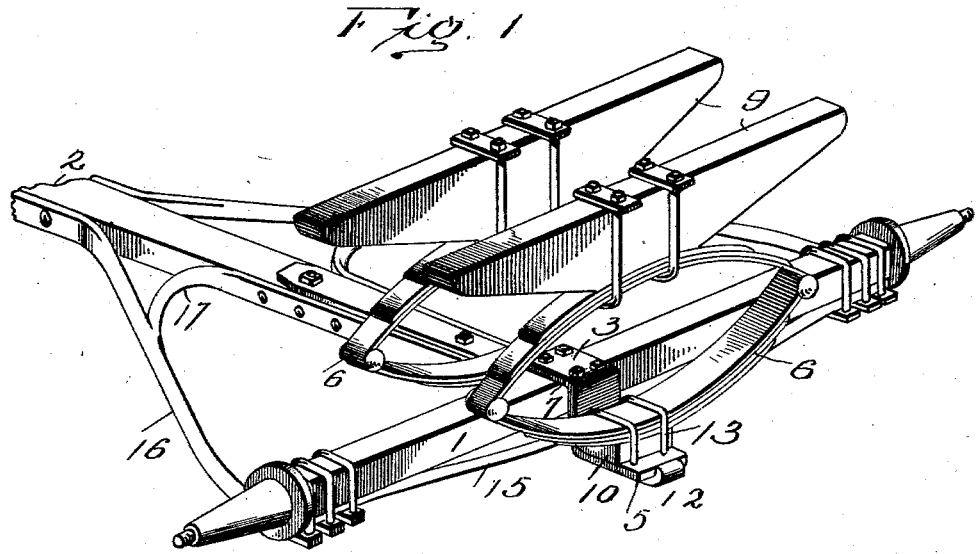
Figure 2:
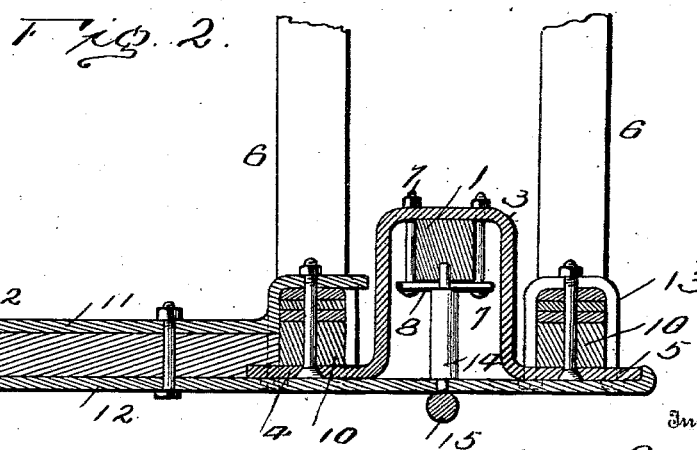
Figure 3:
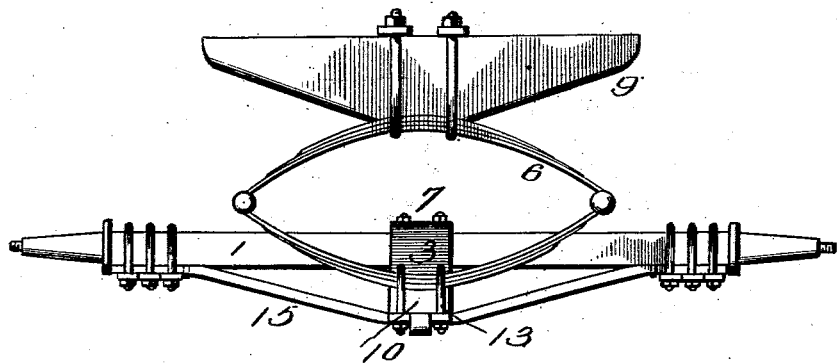
Figure 4:
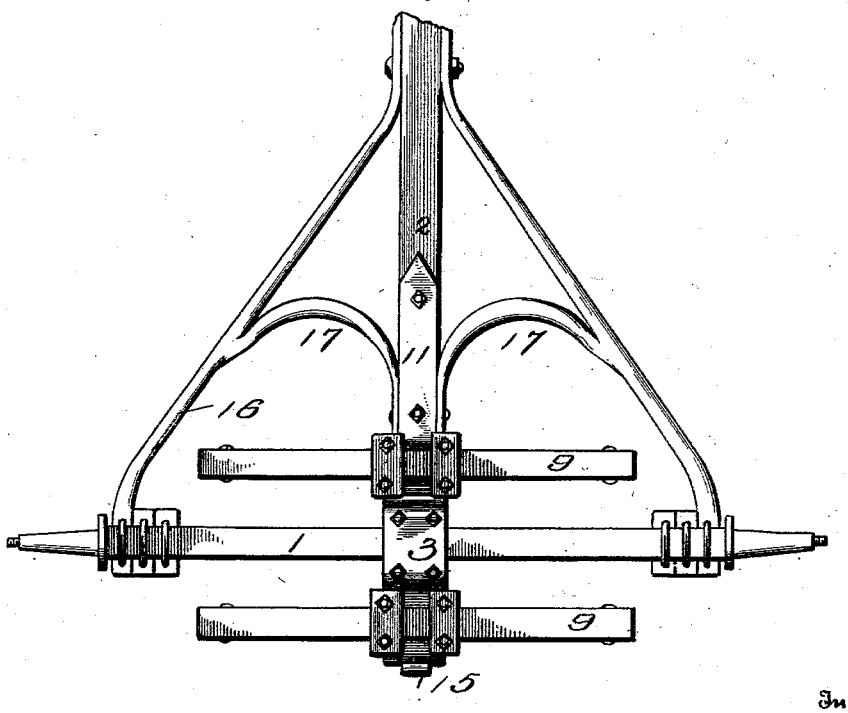

Figure 1 is a perspective view of the rear axle, the hind portion of the reach, the double bolsters and springs, and the mountings therefor entering into the formation of the invention. Fig. 2 is a central longitudinal section of the parts shown in Fig. 1, the bolsters and the upper portion of the springs being omitted. Fig. 3 is a rear view of the parts shown in Fig. 1. Fig. 4 is a top plan view of the elements in the relation shown in Fig. 1.

Corresponding and like parts are referred to in the following description and indicated in all the views of the drawings by the same reference characters.

The rear axle is indicated at 1 and the reach at 2. The saddle or hanger 3 is approximately of U form and has its end portions bent in opposite directions, as shown at 4 and 5, to form rests or seats for the elliptical springs 6, which are arranged in parallel relation upon opposite sides of the axle 1. The legs or vertical members of the saddle or hanger are spaced from opposite sides of the axle and project below the same a short distance to enable the springs 6 to obtain a purchase at a point below the axle, whereby the body of the vehicle may be low down. The saddle or hanger is clipped or otherwise rigidly connected to the axle, and, as shown, bolts 7 embrace opposite sides of the axle and pass through openings in the horizontal portion of the saddle or hanger and other openings of a yoke or gland 8, arranged beneath the axle.

The springs 6 may be of any type, such as commonly employed in running-gear for supporting the vehicle-body, and, as shown, they are of the elliptical variety and support bolsters 9, which are clipped or otherwise secured to their upper members, said springs being seated upon blocks 10, placed upon the rests or oppositely-extended ends 4 and 5 of the saddle or hanger.

The reach 2 abuts against the foremost block 10 and rests upon the forward rest 4 and is connected to the saddle or hanger by means of irons 11 and 12, arranged above and below the reach and bolted thereto. The rear end of the iron 11 is offset and overlaps the lower member of the spring mounted upon the rest 4, and the iron 12 extends across the space formed between the legs or members 3 of the saddle and is secured to the front and rear rests 4 and 5, preferably by the same means or clips 13 employed for connecting the springs to the said rests. The iron 12 besides connecting the reach to the saddle braces the members of the latter and also forms a support for the axle at a central point, a post 14 being interposed between said iron 12 and the axle, as indicated most clearly in Fig. 2. A truss-brace 15 is clipped at its ends to the outer portion of the axle 1, and its central portion comes beneath the iron 12 and touches the same about opposite the post 14.

From the foregoing it will be understood that the load upon the springs 6 is equalized upon opposite sides of the axle 1, thereby obviating torsional strain upon the axle and its connections. By having the rests 4 and 5 below the axle the wheels may be of comparatively larger diameter and the body of the vehicle may be low down, which is of advantage, as it is not necessary to provide a drop in the axle, the latter being straight and reinforced by the truss-brace 15 and the parts 12 and 14 in the manner stated. The connection between the reach and axle 1 is strengthened by the hounds 16 and braces 17, the latter being curved and springing from the hounds 16 intermediate of their ends and the free ends of the hounds and braces being connected to opposite sides of the reach 2 and the rear ends of the hounds being clipped to the axle, substantially as shown.

Having thus described the invention, what is claimed as new is—

1. In vehicle running-gear, the combination of an axle, a saddle secured to the axle and having its vertical members projected below the axle and terminating in front and rear rests, bolsters supported by said rests, and means connecting the rests below the axle, substantially as specified.

2. In vehicle running-gear, the combination of an axle, a reach, a saddle secured to the axle and having its vertical members projected below the axle and terminating in front and rear rests, and means connecting the reach to the saddle and spanning the space formed between the members of said saddle and connecting the rests thereof, substantially as set forth.

3. In combination, an axle, a saddle secured to said axle and having its vertical members projected below the axle and terminating in front and rear rests, bolsters supported by means of said rests, means connecting the rests, and a support between the axle and the means connecting said rests, substantially as set forth.

4. In combination, an axle, a centrally-disposed saddle connected thereto and having its vertical members projected below the axle and terminating in front and rear rests, bolsters supported by means of said rests, an iron connecting the rests and spanning the space formed between them, a post intermediate the said iron and the axle, and a truss-brace connected at its ends to the outer portions of the axle and having its intermediate portion coming beneath the said iron, substantially as set forth.

In testimony whereof I affix my signature in presence of two witnesses.

AARON GROFF. [L. S.]

Witnesses:
C. C. BAER,
J. W. WISNER.